(12) United States Patent
Morelli

(10) Patent No.: US 8,573,624 B2
(45) Date of Patent: Nov. 5, 2013

(54) BICYCLE SADDLE OR HANDLEBAR HEIGHT ADJUSTMENT DEVICE

(76) Inventor: Angelo Morelli, Pontenure (IT)

( * ) Notice: Subject to any disclaimer, the term of this patent is extended or adjusted under 35 U.S.C. 154(b) by 0 days.

(21) Appl. No.: 13/320,588

(22) PCT Filed: May 14, 2010

(86) PCT No.: PCT/EP2010/056666
§ 371 (c)(1),
(2), (4) Date: Nov. 15, 2011

(87) PCT Pub. No.: WO2010/133521
PCT Pub. Date: Nov. 25, 2010

(65) Prior Publication Data
US 2012/0062003 A1    Mar. 15, 2012

(30) Foreign Application Priority Data

May 19, 2009   (IT) .................. MI2009A0882

(51) Int. Cl.
*B62J 1/00*     (2006.01)
(52) U.S. Cl.
USPC .............. 280/288.4; 280/220; 297/215.13; 297/195.1
(58) Field of Classification Search
USPC ............ 280/288.4, 220; 297/215.13, 195.1
See application file for complete search history.

(56) References Cited

U.S. PATENT DOCUMENTS

| 5,713,555 | A | * | 2/1998 | Zurfluh et al. | ............ | 248/599 |
| 6,050,585 | A | | 4/2000 | Rai | | |
| 8,016,349 | B2 | * | 9/2011 | Mouri et al. | ............ | 297/215.13 |
| 2008/0127770 | A1 | | 6/2008 | Morelli | | |

FOREIGN PATENT DOCUMENTS

| DE | 19946100 A1 | 4/2001 |
| EP | 1927538 A1 | 6/2008 |
| FR | 602735 | 3/1926 |

OTHER PUBLICATIONS

International Search Report from PCT/EP2010/056666 (WO 2010/133521 A1) to Morelli, dated Jul. 6, 2010.

* cited by examiner

*Primary Examiner* — Tashiana Adams
*Assistant Examiner* — Marlon Arce
(74) *Attorney, Agent, or Firm* — Novak Druce Connolly Bove + Quigg LLP

(57) ABSTRACT

A bicycle saddle and handlebar height adjustment device including a tubular element provided with elements for its connection to the saddle, and presenting a portion cooperating with a support element for the tubular element. The support element is associated with a ring nut rotating thereon and presenting a first thread cooperating with a corresponding first counter-thread provided on the tubular element. An alignment element is present to maintain the angular position between the tubular element and the support element. The ring nut is associated with the support element by way of a second thread cooperating with a corresponding second counter-thread provided on the support element. The first and second threads are counter-rotating.

16 Claims, 1 Drawing Sheet

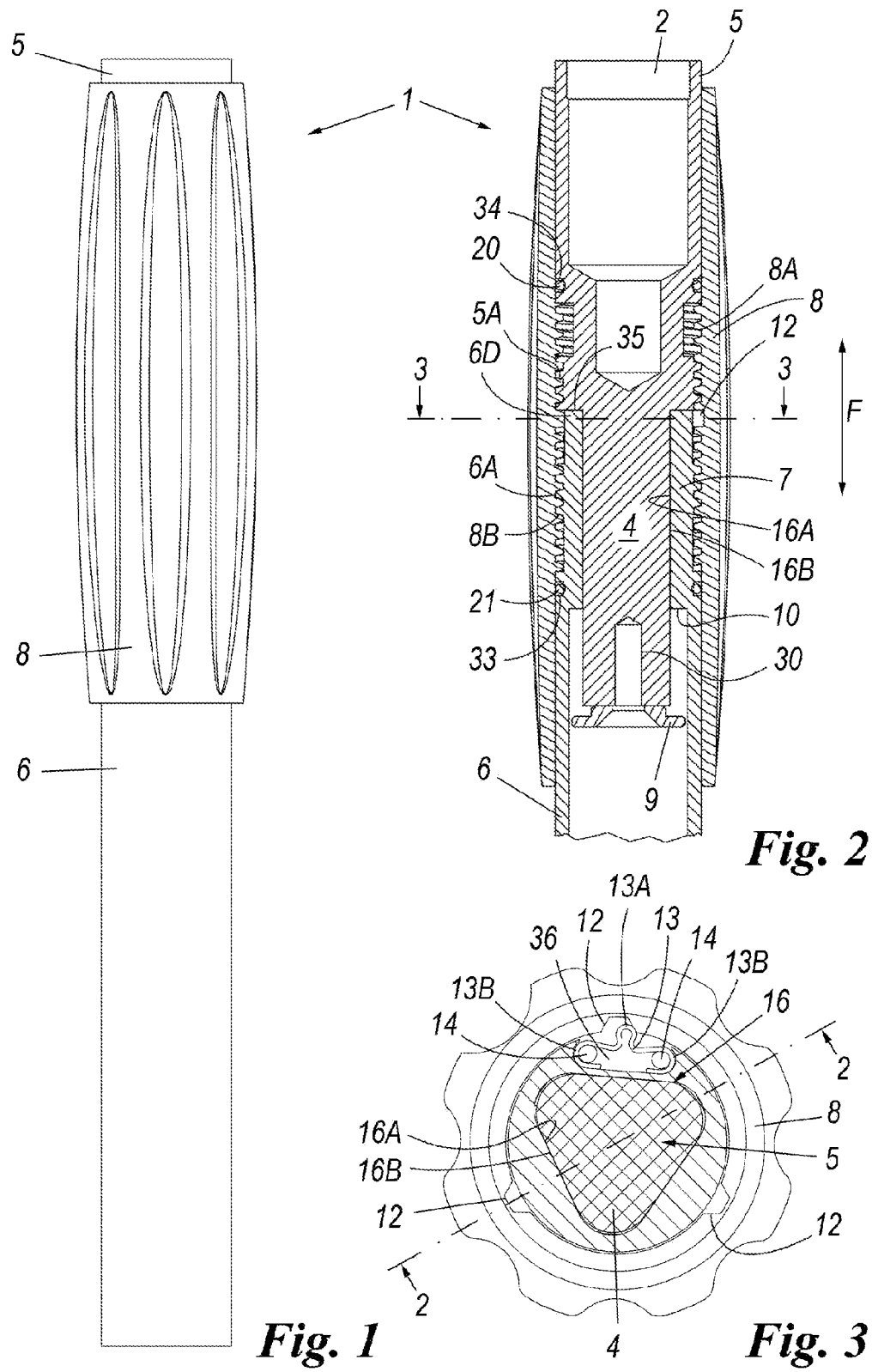

BICYCLE SADDLE OR HANDLEBAR HEIGHT ADJUSTMENT DEVICE

CROSS-REFERENCE TO RELATED APPLICATIONS

This application is a §371 National Stage Application of International Application No. PCT/EP2010/056666, filed on May 14, 2010, claiming the benefit of Italian Application No. MI2009A000882 filed on May 19, 2009.

The present invention relates to an improved bicycle saddle or handlebar height adjustment device in accordance with the introduction to the main claim.

A saddle or handlebar height adjustment device is known from EP1927538. Although the device described in said patent well attains its stated objects, it is rather complicated mechanically and is formed from a large number of parts. FR 602735 discloses a junction or tensioning device for shafts placed the one inside the other. U.S. Pat. No. 6,050,585 and DE 199 46 100 A1 disclose adjusting devices for the height of a bicycle or motorbike handlebar or saddle.

An object of the present invention is therefore to provide an improved bicycle saddle or handlebar height adjustment device which enables their height to be precisely adjusted while seated on the bicycle, without interrupting riding, i.e. without having to stop, in particular during races, but which is more simple than, and represents an improvement on, that of the known art.

These and other objects are attained by providing an improved bicycle saddle or handlebar height adjustment device in accordance with the technical teachings of the accompanying claims.

Further characteristics and advantages of the invention will be apparent from the description of a preferred but non-exclusive embodiment of a bicycle saddle or handlebar height adjustment device, illustrated by way of non-limiting example in the accompanying drawings, in which:

FIG. 1 is a plan view of a device according to the present invention;

FIG. 2 is an enlarged section taken on the line 2-2 of FIG. 3; and

FIG. 3 is an enlarged section taken on the line 3-3 of FIG. 2.

With reference to said figures, these show an improved bicycle saddle height adjustment device indicated overall by 1.

The adjustment device comprises a support element defined by a tube piece 6, conventionally fixable within a bicycle frame (not shown). The tube piece 6 is lockable to the frame by a locking nut. A portion 4 of a tubular element 5 is inserted into the tube piece 6, this latter being fixable to a saddle. More precisely, the tubular element 5 slidably penetrates as a form fit 16 into a seat of shape corresponding to that of the element 4, provided in the support element 6.

Essentially, the portion 4 presents a profile 16A which slidably cooperates with a corresponding profile 16B, to make the support element 6 and the tubular element 5 torsionally rigid, however these can slide mutually in the axial direction (arrow F). In the illustrated example, the form fit is achieved by an equilateral triangle cross-section with radiused angles, however as known to the expert of the art it can be of any shape. Even a grooved profile, for example, answers the purpose.

The portion 4 of the tubular element 5 lowerly presents a threaded hole 30 which is used by a screw (not shown) to fix a limit stop 9 which, on encountering a step 10 provided in the support element 6, limits the relative travel of the two elements. The mutual movement of the support element 6 and tubular element 5 is achieved by a ring nut 8, which at least partially surrounds both the elements. The ring nut 8 presents a first thread 8A cooperating with a corresponding counter-thread 5A provided on the tubular element. A second thread 8B is also present on the ring nut to cooperate with a corresponding second counter-thread 6A provided on the support element 6.

The first and second thread are counter-rotating, such that operating the ring nut causes the tubular element and the support element to approach each other (or mutually withdraw), hence once the device is fixed to a frame via 6 and to a saddle via 5, this latter can be height-adjusted.

The travel stroke of the two elements is regulated by the ledge 35 of the tubular element 5 abutting against the support element and by the limit stop 9 abutting against the support element 6.

Advantageously, the support element and the tubular element comprise grooves 34, 33 housing sealing O-rings 20, 21 provided above and below the threaded couplings, to isolate them from dust, water and dirt. To improve the seal, several seal rings can evidently be provided housed in further respective grooves.

In a head portion 60 of the support element 6 a housing 36 is preferably provided to house a flat spring bent such as to present two U-shaped portions wrapped about two fixing pins 14 and a central end 13A which projects beyond the outer perimeter of the support element 6. The central end of the spring is arranged to snap-penetrate into one or more seats 12 provided in the inner surface of the ring nut, in a position facing the spring. This provides a snap means enabling the ring nut to undergo a discrete rotation.

In the illustrated embodiment, three equidistant seats 12 are provided. The number provided can be more or less, depending on requirements.

Several housings 36 can also be provided, each to house a respective spring 13.

Advantageously three housings are present for three respective springs. This results in a more precise movement of the ring nut and greater stability of the mutual position of the tubular element and support element.

A preferred embodiment of the invention has been illustrated, but others can be conceived using the same inventive concept. All materials can be replaced by others technically equivalent. For example, the material with which the ring nut, the tubular element and the support element are constructed can be of any type, depending on the requirements of the art.

Particularly preferred are composite materials such as carbon, or very light materials such as titanium or aluminium. Composite materials can also be used for certain parts of the components and light metals for others.

The invention claimed is:

1. A bicycle comprising:
   a saddle and
   a handlebar, and
   a height adjustment device for the saddle or the handlebar, comprising
   a tubular element provided with connection means connected to the bicycle saddle or the bicycle handlebar, and
   a support element for said tubular element, the support element being fixable to a bicycle frame, said support element being associated with a ring nut rotating about the support element, the ring nut presenting a first thread cooperating with a corresponding first counter-thread provided on the tubular element, alignment means between the tubular element and the support element to maintain the relative angular position between the tubular element and the support element, wherein said ring nut is associated with the support element by a second thread cooperating with a corresponding second counter-thread provided on the support element, the first thread and the second thread being counter-rotating, and wherein said tubular element comprises a portion which fits into a corresponding portion of the support element, said portion comprising a limit stop arranged to abuttingly halt against a step of the support element, to limit the travel of the tubular element.

2. A bicycle as claimed in claim 1, wherein said alignment means comprise a form fit between the support element and the tubular element.

3. A bicycle as claimed in claim 1, wherein said support element is a saddle tube piece fixable to the bicycle frame by a fixing device.

4. A bicycle as claimed in claim 1, wherein said ring nut comprises snap means enabling it to undergo a discrete rotation.

5. A bicycle as claimed in claim 1, wherein at least one seat is provided in said ring nut cooperating with at least one elastic element rigid with said support element and/or with said tubular element.

6. A bicycle as claimed in claim 5, wherein said seats are three in number, provided equidistant on the internal face of the ring nut.

7. A bicycle as claimed in claim 5, wherein there is more than one seat, and wherein two elastic elements are provided, cooperating with said seats.

8. A bicycle as claimed in claim 1, wherein said ring nut externally comprises axial grooves arranged to facilitate its gripping.

9. A bicycle as claimed in claim 1, wherein gasket means are provided between said ring nut and said tubular element and/or between said ring nut and said support element.

10. A bicycle comprising:
a saddle and
a handlebar, and
a height adjustment device for the saddle or the handlebar, comprising a tubular element provided with connection means connected to the bicycle saddle or the bicycle handlebar, and a support element for said tubular element, the support element being fixable to a bicycle frame, said support element being associated with a ring nut rotating about the support element, the ring nut presenting a first thread cooperating with a corresponding first counter-thread provided on the tubular element, alignment means between the tubular element and the support element to maintain the relative angular position between the tubular element and the support element, wherein said ring nut is associated with the support element by a second thread cooperating with a corresponding second counter-thread provided on the support element, the first thread and the second thread being counter-rotating, wherein gasket means are provided between said ring nut and said tubular element and/or between said ring nut and said support element.

11. A bicycle as claimed in claim 10, wherein said support element is a saddle tube piece fixable to the bicycle frame by a fixing device.

12. A bicycle as claimed in claim 10, wherein said ring nut comprises snap means enabling it to undergo a discrete rotation.

13. A bicycle as claimed in claim 10, wherein at least one seat is provided in said ring nut cooperating with at least one elastic element rigid with said support element and/or with said tubular element.

14. A bicycle as claimed in claim 13, wherein said seats are three in number, provided equidistant on the internal face of the ring nut.

15. A bicycle as claimed in claim 13, wherein there is more than one seat, and wherein two elastic elements are provided, cooperating with said seats.

16. A bicycle as claimed in claim 10, wherein said ring nut externally comprises axial grooves arranged to facilitate its gripping.

* * * * *